US012242657B2

(12) United States Patent
Rice et al.

(10) Patent No.: US 12,242,657 B2
(45) Date of Patent: Mar. 4, 2025

(54) METHOD AND SYSTEM OF CROWN BASED FOR ADVERSARIAL ATTACKS

(71) Applicants: Robert Bosch GmbH, Stuttgart (DE); Carnegie Mellon University, Pittsburgh, PA (US)

(72) Inventors: Leslie Rice, Pittsburgh, PA (US); Huan Zhang, Pittsburgh, PA (US); Wan-Yi Lin, Wexford, PA (US); Jeremy Kolter, Pittsburgh, PA (US)

(73) Assignees: Robert Bosch GmbH (DE); Carnegie Mellon University

( * ) Notice: Subject to any disclaimer, the term of this patent is extended or adjusted under 35 U.S.C. 154(b) by 231 days.

(21) Appl. No.: 17/873,661

(22) Filed: Jul. 26, 2022

(65) Prior Publication Data
US 2024/0037282 A1    Feb. 1, 2024

(51) Int. Cl.
G06V 10/44     (2022.01)
G06F 21/64     (2013.01)
G06V 10/764    (2022.01)

(52) U.S. Cl.
CPC ............ *G06F 21/64* (2013.01); *G06V 10/454* (2022.01); *G06V 10/764* (2022.01)

(58) Field of Classification Search
CPC .......... G06F 21/64; G06N 3/04; G06N 20/00; G06V 10/44; G06V 10/454; G06V 10/764; G06V 20/582; G06V 20/58; G06V 10/82; G06V 10/267; G06V 10/774
See application file for complete search history.

(56) References Cited

U.S. PATENT DOCUMENTS

| | | | | |
|---|---|---|---|---|
| 11,373,093 B2* | 6/2022 | Gu | ........................ | G06V 10/774 |
| 2010/0124359 A1* | 5/2010 | Vaidya | .................... | G06V 20/52 |
| | | | | 382/199 |
| 2023/0024101 A1* | 1/2023 | de Haan | ................ | G06N 3/047 |
| 2023/0096021 A1* | 3/2023 | Trockman | .............. | G06N 3/084 |
| | | | | 382/156 |
| 2024/0005173 A1* | 1/2024 | Lomuscio | .............. | G06N 3/045 |

FOREIGN PATENT DOCUMENTS

CN    113469873 A    * 10/2021

OTHER PUBLICATIONS

"Certified Defenses for Adversarial Patches"—Chiang et al, ICLR 2020, Mar. 2020 https://openreview.net/pdf?id=HyeaSkrYPH (Year: 2020).*

(Continued)

*Primary Examiner* — Randy A Scott
(74) *Attorney, Agent, or Firm* — Dickinson Wright PLLC

(57) ABSTRACT

A method of identifying an attack comprising receiving an input of one or more images, wherein the one or more images includes a patch size and size, divide the image into a first sub-image and a second sub-image, classify the first sub-image and the second sub-image, wherein classifying is accomplished via introducing a variable in a pixel location associated with the first and second sub-image, and in response to classifying the first and second sub-image and identifying an adversarial patch, output a notification indicating that the input is not certified.

20 Claims, 8 Drawing Sheets

(56) References Cited

OTHER PUBLICATIONS

"Adversarial Attacks for Image Segmentation on Multiple Lightweight Models"—Kang et al., IEEE Access, Feb. 20, 2020 https://ieeexplore.ieee.org/stamp/stamp.jsp?tp=&arnumber=8990068 (Year: 2020).*
Chiang et al., "Certified Defenses for Adversarial Patches", Published as a conference paper at ICLR 2020, 16 pages.
Wang et al, "Beta-CROWN: Efficient Bound Propagation with Per-neuron Split Constraints for Neural Network Robustness Verification", 35th Conference on Neural Information Processing Systems (NeurIPS 2021), Sydney, Australia, 27 pages.
Anonymous, "Certified Patch Robustness Via Smoothed Vision Transformers", Under review as a conference paper at ICLR 2022, 26 pages.
Brendel et al., "Approximating CNNS With Bag-of-Localfeatures Models Works Surprisingly Well on Imagenet", arXiv:1904.00760v1 [cs.CV] Mar. 20, 2019, Published as a conference paper at ICLR 2019, 15 pages.
Website for "Image Classification with ConvMixer", https://colab.research.google.com/github/keras-team/keras-io/blob/master/examples/vision/ipynb/convmixer.ipynb, retrieved on Jul. 26, 2022, 7 pages.
Oh et al., "Towards Reverse-Engineering Black-Box Neural Networks", arXiv:1711.01768v3 [stat.ML] Feb. 14, 2018, Published as a conference paper at ICLR 2018, 20 pages.

* cited by examiner

METHOD AND SYSTEM OF CROWN BASED FOR ADVERSARIAL ATTACKS

TECHNICAL FIELD

The present disclosure relates to image quantization using machine learning.

BACKGROUND

Machine learning networks may have adversarial training of neural networks for classification. The classifier performance may be robustified against such perturbations, but such systems may lack provable performance guarantees. Such networks have been increasingly shown to be lacking robustness.

SUMMARY

A first embodiment discloses, a method of identifying an attack includes receiving an input of one or more images, wherein the one or more images includes a patch size and size, dividing the image into a first sub-image and a second sub-image; classify the first sub-image and the second sub-image, wherein classifying is accomplished via introducing a variable in a pixel location associated with the first and second sub-image; and in response to classifying the first and second sub-image and identifying an adversarial patch, output a notification indicating that the input is not certified.

A second embodiment discloses, a system for classifying an image includes a sensor configured to generate one or more images, a controller in communication with the sensor and configured to receive an input of one or more images, wherein the one or more images includes a patch size and size, divide the image into a first sub-image and a second sub-image, classify the first sub-image and the second sub-image, wherein classifying is accomplished via introducing a variable in a pixel location associated with the first and second sub-image, and in response to classifying the first and second sub-image and identifying an adversarial patch, output a notification indicating that the input is not certified.

A third embodiment discloses, a method of identifying an attack comprising receiving an input of one or more images, wherein the one or more images includes a patch size and size, divide the image into a first sub-image and a second sub-image, classify the first sub-image and the second sub-image, wherein classifying is done via locating a variable in a pixel location associated with the first and second sub-image, in response to classifying the first and second sub-image and not identifying an adversarial patch, continue to divide the image into a plurality of sub-images and classify the sub-images, and output a notification indicating that the input is not certified in response to identifying an adversarial patch in one of the plurality of sub-images.

DETAILED DESCRIPTION

Figure 1:
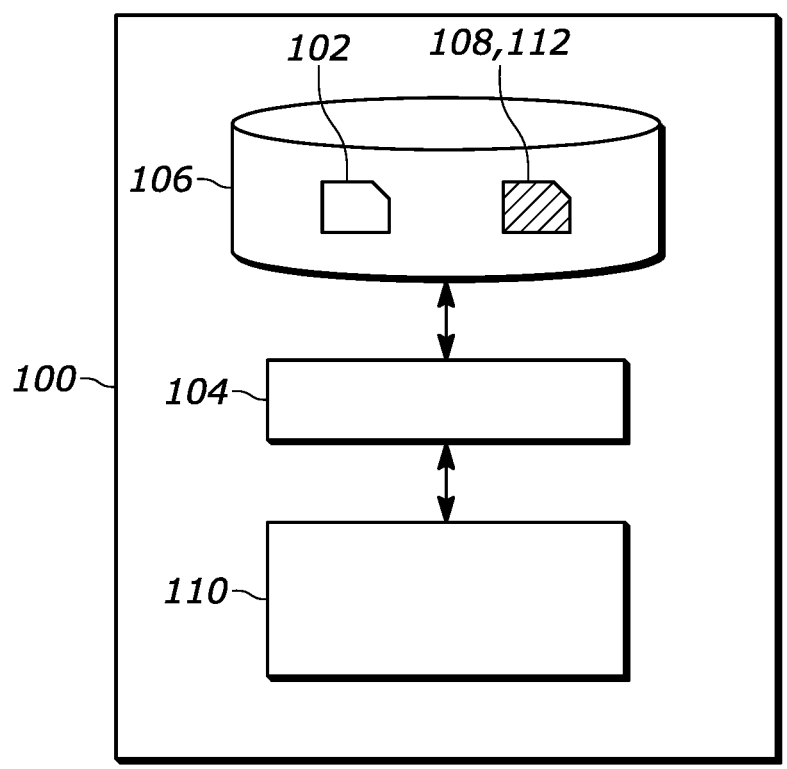
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

An adversarial patch can be at any location of the image, hence to certify a sample x, one needs to find the "worst" location for the classifier, meaning the lowest $f\_L^*$ for all patch locations.

Consider image x of size w×h and the set of all pixel locations is $S=\{(i,j)$ where $0 \le i \le w, 0 \le j \le h\}$. To solve this, we first proposes branch-and-bound on the input space:

Branch and bound divides the domain of the verification problem cover into the following subdomains:

$$\mathcal{C}_1 = \{x_{i,j}, x \in \mathcal{C}, \text{ and } (i,j) \in S_1\}, \mathcal{C}_2 = \{x_{i,j}, x \in \mathcal{C}, \text{ and } (i,j) \in S_2\}, \text{ where } S_1 \cup S_2 = S \quad (1)$$

We can use incomplete verifiers to estimate the lower bound of each subdomain with relaxations. If the lower bound is greater than 0, the subdomain is verified, otherwise we continue to split on the input space ($S_1$ or $S_2$). When all unstable input spaces are split, then verification is complete.

Alternatively, consider the following formulation:

Let p be a patch of size $w_p \times h_p$. Let (lx, ly) be the cornerpixel location of the patchpin imagex. Then, to accommodate a patch of the desired size, lxis constrained to be an integer in the range [1, w–wp], and ly is constrained to be an integer in the range [1, h–hp]. The resulting per-turbed image x' is then constrained by $0 \leq x'_{i,j} \leq 1$, when $i \in [lx, lx+wp]$ and $j \in [ly, ly+hp]$ and $x'_{i,j} = x_{i,j}$ otherwise (e.g. pixels inside the patch can range between 0 and 1, and pixels outside the patch must be equal to the original pixel value in x). Then the problem we want to formulate is the following $$\min_{x', p_x, p_y} f(x'), \ s.t.$$

$$p_x \in [0, w_i - w_p - 1], \ p_y \in [0, h_i - h_p - 1],$$

$0 \leq x'_{i,j} \leq 1$ if $i \in [p_x, p_x + w_p]$ and $j \in [p_y, p_y + h_p]$, $x'_{i,j} = x_{i,j}$ otherwise in order to formulate this in a solvable manner, we first encode the constraint that x is an integer in the range [1, w–wp] by introducing a Boolean variable of size w–wp, with the following constraint:

$$\Sigma_{i=1}^{w-w_p} n_i = 1, \ n_i \in \{0,1\}$$

Similarly, $\Sigma_{i=1}^{h-h_p} m_i = 1, \ m_i \in \{0,1\}$

Now we can use variables n and m to encode whether each (i,j) pixel location is in the patch. A pixel location (i,j) is in the patch if $I \in [lx, lx+wp]$ and $j \in [ly, ly+hp]$. We formulate this by introduce a variable p, with the following constraints:

$$p_{i,j} \geq sx_{i,j} + sy_{i,j} - 1$$

$$p_{i,j} \leq sx_{i,j}$$

$$p_{i,j} \leq sy_{i,j} \quad \text{(Equation 2)}$$

With encoding of pixel values:

$$x'_{i,j} \geq p_{i,j} \cdot 0 + (1 - p_{i,j}) \cdot x_{i,j}$$

$$x'_{i,j} \leq p_{i,j} \cdot 1 + (1 - p_{i,j}) \cdot x_{i,j}$$

This disclosures proposes various methods to certify a neural network $f_\theta$ for image classification against patch attack. The first part of this disclosure is branch and bound at input space. Given a sample x of size w×p and patch size $w_p \times h_p$:

Divide image x into two sub-images as described in (1). For an example, $S_1 = \{(i,j) \text{ where } 0 \leq i \leq \lceil w/2 \rceil + w_p, \ 0 \leq j \leq h\}$, $S_2 = \{(i,j) \text{ where } \lceil w/2 \rceil + w_p \leq i \leq w, \ 0 \leq j \leq h\}$ Verify $C_1$ and $C_2$ separately using method in Equation 2 or Equation 1.

For any of the sub problem $C_1$ and $C_2$, further split it utilizing Equation 1.

Repeat until all sub-domains are certified or split until each sub-domain contains only 1 patch location If all subdomains are certified, return "x is certified", otherwise return "x is not certified"

The second part is mixed integer programming. Given a sample x of size wxp and patch size $w_p \times h_p$, formulate the patch attack problem as $\min_{x', p_x, p_y}(x')$ with constraints in (2) and (3). Solve this problem directly with existing convex program solvers such as cvxpy (as shown in https://github.corn/cvxpy/cvxpy) then use the solved patch location $p_x$ and $p_y$ for verification using methods in Equation 1 or Equation 2.

The third part of this disclosure may utilize bagsnet or convmixer as feature extractor, denoted as T(x), which takes input image of size wxp and output a feature map of wfxpf. Then this feature map is used as input to a MLP denoted as M for final classification, i.e., the classifier f(x)=M(T(x)). Each "pixel" at the feature map represents features extracted from a $w_{rp} \times p_r$ subregion (receptive fields) of the input space. Suppose the adversarial patch (size $w_p \times h_p$ in the input space) can at most influence $w_a \times p_a$ subregions, then we can use the same method as the first part of this invention, treating the wfxpf feature map as input, and the adversarial patch size is $w_a \times p_a$.

To use the certification methods to train a robust model, the system may implement a two-step training: given a dataset (x,y), the classifier $f_\theta$, and the loss function 1

1) First pre-train f on the dataset without adversarial patch using loss function 1,
2) Then start with the weights obtained from 1, for each sample (x,y), f(x), and certified bound b (i.e., difference between upper bound and lower bound): update patch δ with $\partial l(x, f(x))/\partial x$
   a. If x is certified accurately, update θ with $-\partial l(x, f(x))/\partial \theta$
   b. Else update θ with $\partial b(x,y)/\partial \theta$ Reference is now made to the embodiments illustrated in the Figures, which can apply these teachings to a machine learning model or neural network. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the image-to-image machine-learning model and the mixer machine-learning model described herein. Additional structure for operating and training the machine-learning models is shown in FIG. 2.

Figure 2:
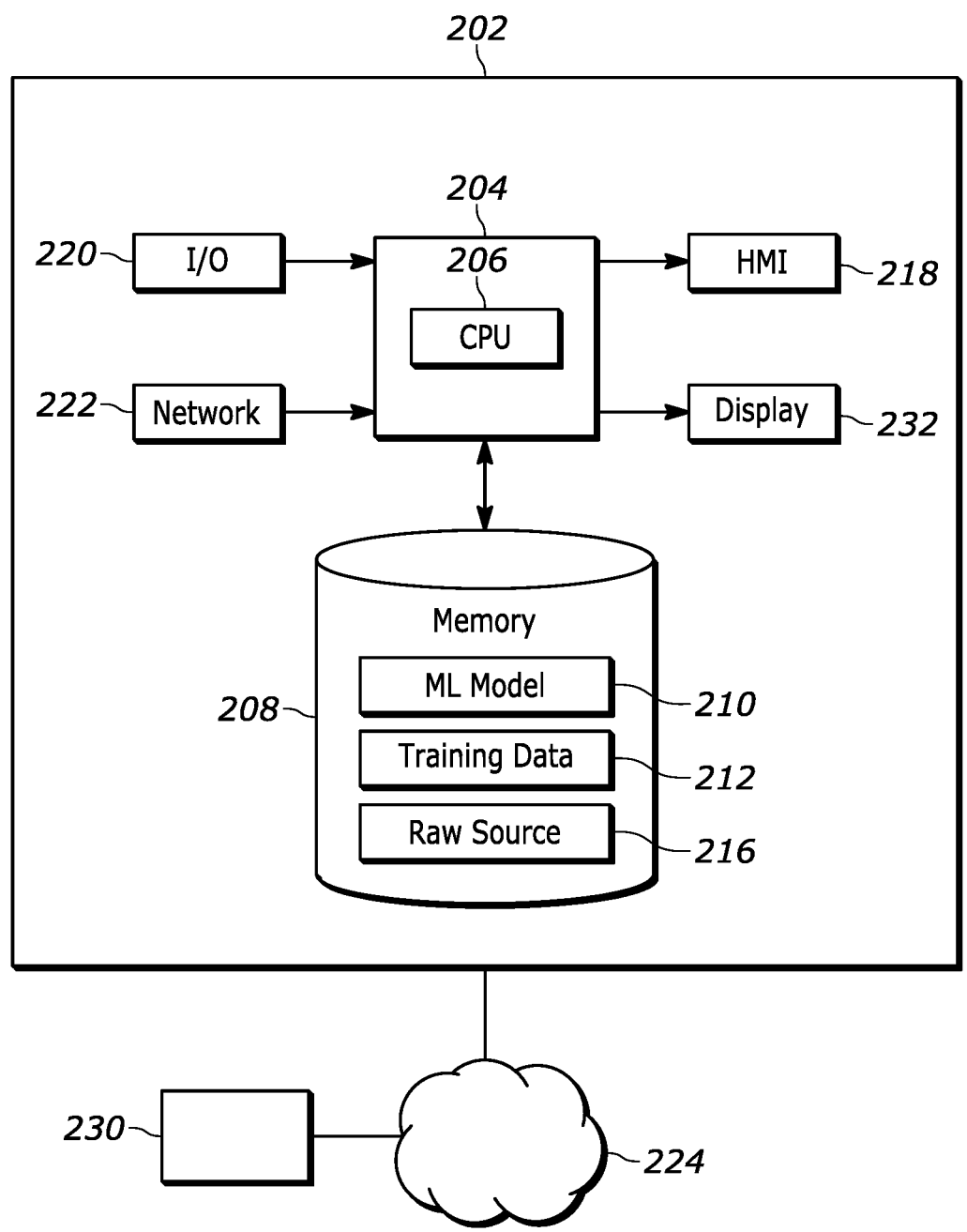
FIG. 2 shows a computer-implemented method for training and utilizing a neural network, according to an embodiment.

FIG. 2 depicts a system 200 to implement the machine-learning models described herein, for example the image-to-image machine-learning model, the mixer machine-learning model, and the pre-trained reference model described herein. The system 200 can be implemented to perform image quantization processes described herein. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuity or BUS networks to transfer information to or between the processor(s) and storage. For example, the I/O interface 220 can include digital I/O logic lines which can be read or set by the processor(s), handshake lines to supervise data transfer via the I/O lines; timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). Several different examples of inputs are shown and described with reference to FIGS. 5-11. In some examples, the machine-learning algorithm 210 may be a neural network algorithm (e.g., deep neural network) that is designed to perform a predetermined function. For example, the neural network algorithm may be configured in automotive applications to identify street signs or pedestrians in images. The machine-learning algorithm(s) 210 may include algorithms configured to operate the image-to-image machine-learning model, the mixer machine-learning model, and the pre-trained reference model described herein.

The computer system 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of a road sign in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., road sign). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

In an example, the raw source data 216 may include image data representing an image. Applying the machine-learning algorithms (e.g., image-to-image machine learning model, mixer machine-learning model, and pre-trained reference model) described herein, the output can be a quantized version of the input image.

Figure 3:
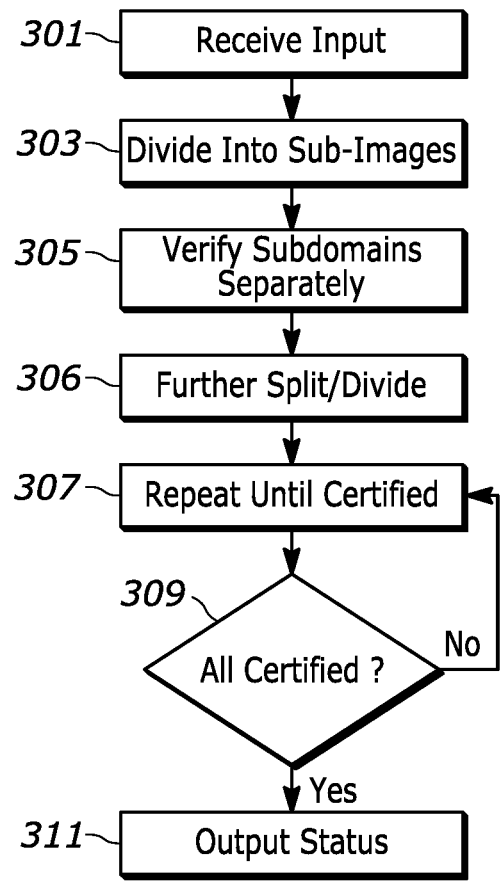
FIG. 3 illustrates an illustrative flow chart to certify a neural network for image classification against a patch attack.

FIG. 3 illustrates an illustrative flow chart to certify a neural network for image classification against a patch attack. The method may include to branch and bound at an input space. At step 301, the system may receive an input or an image. The image may include any type of image. Such an image may include LIDAR, radar, sonar, thermal, heat, or temperature image. Thus the image may be received by any number of sensors and cameras, such as LIDAR, radar, sonar, microphone, thermal sensors, heat sensors, etc.

At step 303, the system may divide the image x into two sub-images. The images may be divided by branch and bound method which divides the domain of the verification problem C into subdomains. Thus, it may be divided into the following subdomains $\mathcal{C}_1=\{x_{i,j},\ x\in\mathcal{C},\ \text{and}\ (i,j)\in S_1\}$, $\mathcal{C}_2=\{x_{i,j},\ x\in\mathcal{C},\ \text{and}\ (i,j)\in S_2\}$, where $S_1\cup S_2=S$. In another example, $S_1=\{(i,j)\ \text{where}\ 0\le i\le \lceil w/2\rceil+w_p,\ 0\le j\le h\}$, $S_2=\{(i,j)\ \text{where}\ \lceil w/2\rceil+w_p\le i\le w,\ 0\le j\le h\}$.

At step 305, the system may Verify $C_1$ and $C_2$ separately. For example, the system may utilize variables n and m to encode whether each (i,j) pixel location is in the patch. A pixel location (i,j) may be in the patch if $i\in[lx, lx+wp]$ and $j\in[ly, ly+hp]$. This may be formulated by introducing a variable p, with the following constraints:

$$p_{i,j}\ge sx_{i,j}+sy_{i,j}-1$$

$$p_{i,j}\le sx_{i,j}$$

$$p_{i,j}\le sy_{i,j}$$

At step 306, the system may further split or divide the sub images in some scenarios if there is a sub-problem. For example, the system may divide the sub-problem utilizing either $\mathcal{C}_1=\{x_{i,j},\ x\in\mathcal{C},\ \text{and}\ (i,j)\in S_1\}$, $\mathcal{C}_2=\{x_{i,j},\ x\in\mathcal{C},\ \text{and}\ (i,j)\in S_2\}$, where $S_1\cup S_2=S$. Thus for any of the subproblems $C_1$ and $C_2$, the system may be further divided.

At step 307, the system may repeat all of the steps until all sub-domains are certified, or split until each sub-domain contains only one patch location. Thus, the system may verify and further split the sub-images until either or both of these circumstances occur.

At decision 309, the system may determine if all the subdomains are certified. Thus, the system may analyze the subdomains to determine whether they are certified. If they are certified, the system may return that the input is certified (e.g., return "x is certified") at the output of step 311. If they are not certified, the system may return that the input is not certified (e.g., return "x is not certified.")

In the alternative, another portion may include a mixed integer programming. Given a sample x of size wxp and patch size $w_p \times h_p$, formulate the patch attack problem as $\min_{x', p_x, p_y} f(x')$ with the following constraints:

$$p_{i,j} \geq sx_{i,j} + sy_{i,j} - 1$$

$$p_{i,j} \leq sx_{i,j}$$

$$p_{i,j} \leq sy_{i,j}$$

With encoding of pixel values:

$$x'_{i,j} \geq p_{i,j} \cdot 0 + (1 - p_{i,j}) \cdot x_{i,j}$$

$$x'_{i,j} \leq p_{i,j} \cdot 1 + (1 - p_{i,j}) \cdot x_{i,j}$$

The system may be able to solve this problem directly with existing convex program solvers such as cvxpy (https://github.com/cvxpy/cvxpy) then use the solved patch location $p_x$ and $p_y$ for verification using methods described above, including those as related to formulas [1] or [2].

Figure 4:
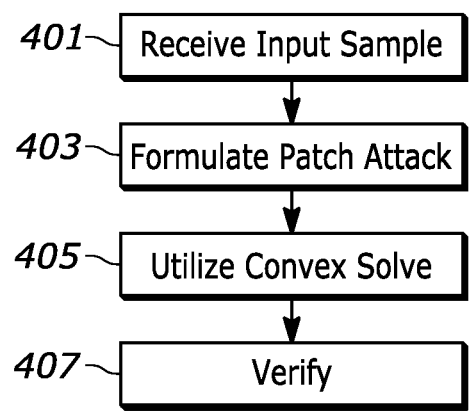
FIG. 4 FIG. 4 illustrates an exemplary embodiment of a flowchart of utilizing mixed integer programming.

FIG. 4 illustrates an exemplary embodiment of a flowchart of utilizing mixed integer programming. At step 401, the system may receive a sample x of size w. Given a sample x of size wxp and patch size $w_p \times h_p$, at step 403, the system may formulate the patch attack problem as $\min_{x', p_x, p_y} f(x')$ with constraints in equations [2] and [3)]. The system may then solve this problem directly utilizing a convex program solvers in step 405. The system may utilize existing convex program solvers such as cvxpy (https://github.com/cvxpy/cvxpy). At step 407, the system may use the solved patch location $p_x$ and $p_y$ for verification using methods in equations [1] or [2].

Figure 5:
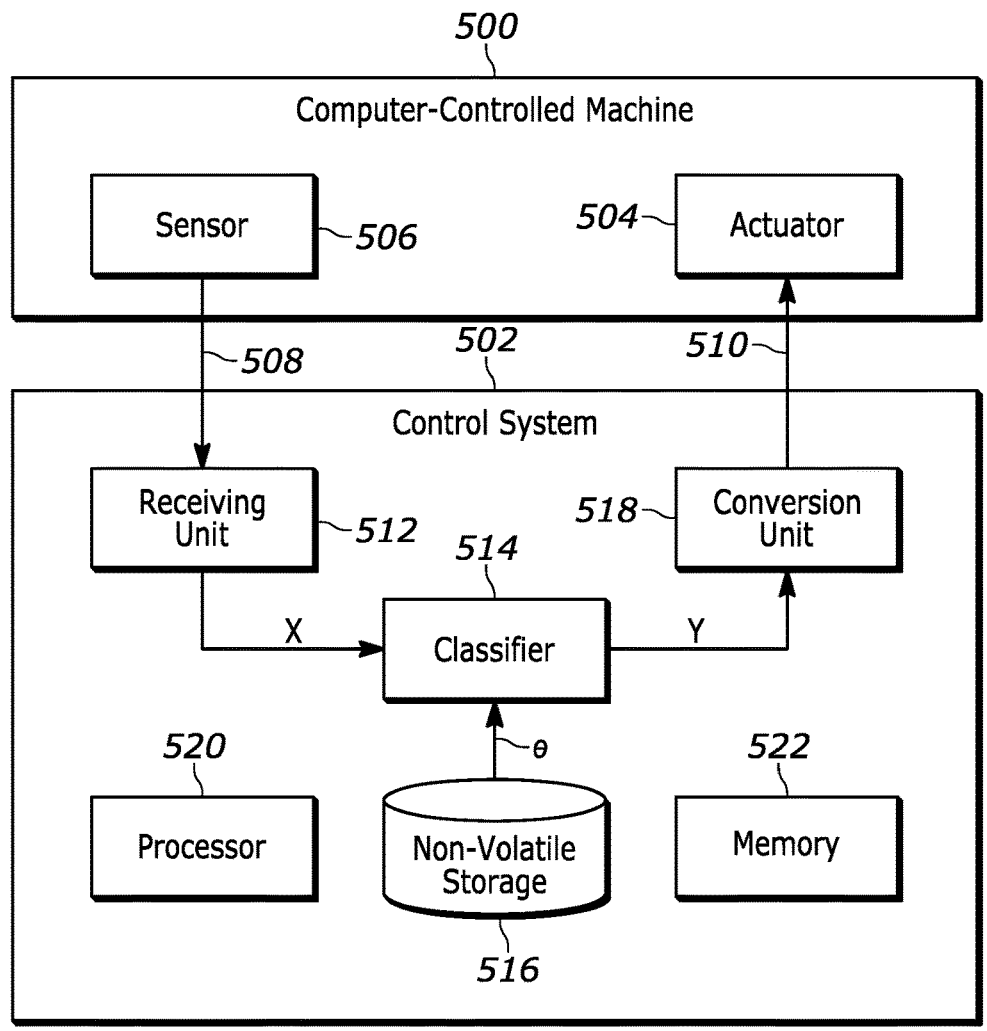
FIG. 5 depicts a schematic diagram of an interaction between a computer-controlled machine and a control system, according to an embodiment.

The machine-learning models described herein can be used in many different applications, and not just in the context of road sign image processing. Additional applications where image quantization may be used are shown in FIGS. 6-11. Structure used for training and using the machine-learning models for these applications (and other applications) are exemplified in FIG. 5. FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine-learning algorithms, such as those described above with regard to pre-trained classifier 306) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
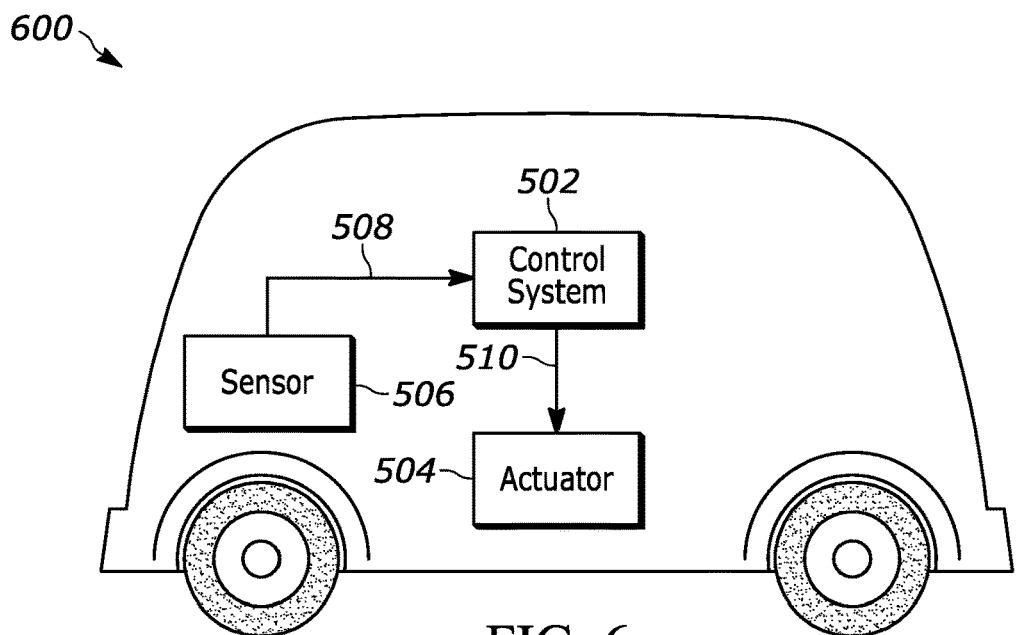
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
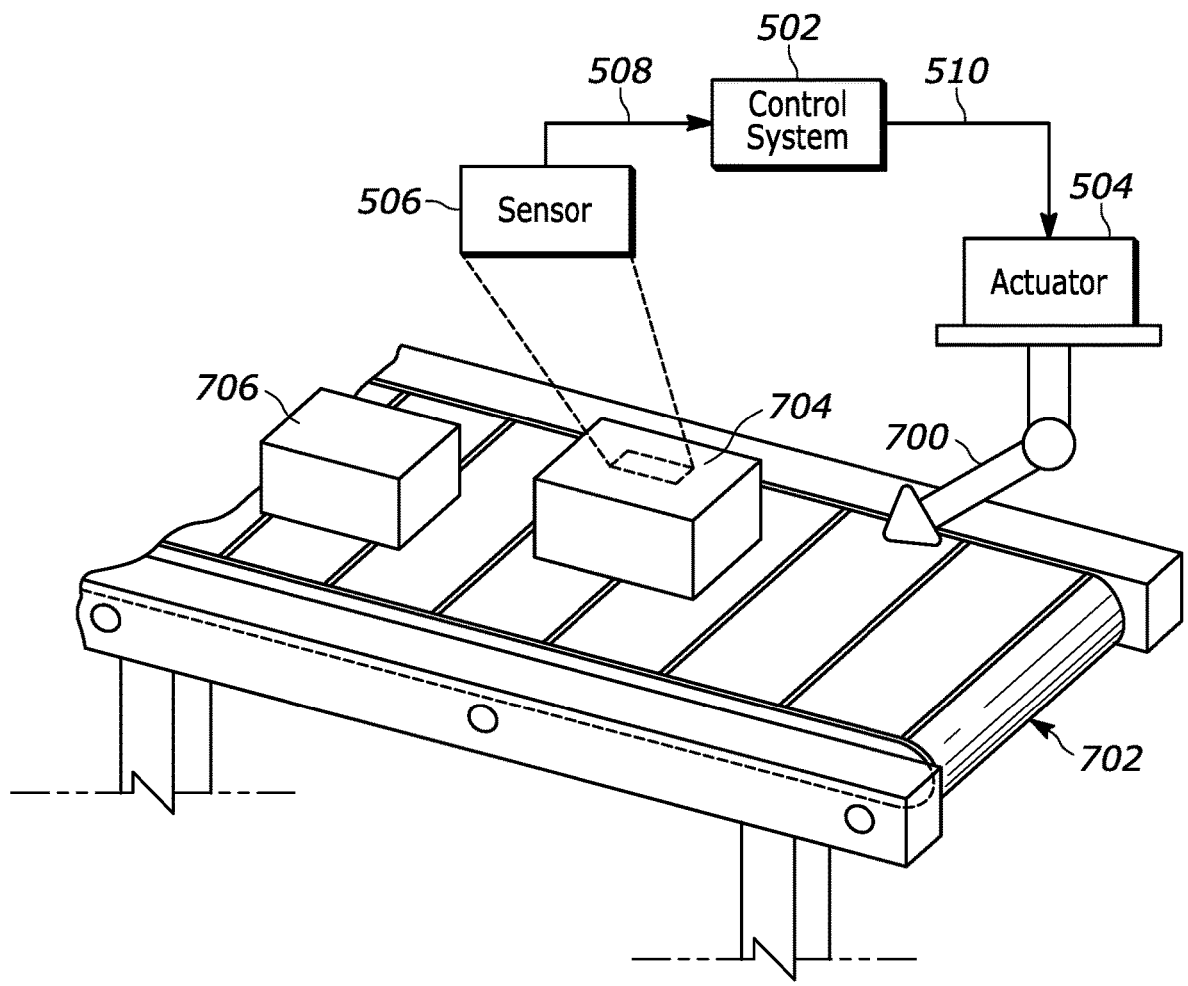
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 106 of system 700 (e.g., manufacturing machine) depending on the determined state of manufactured product 704.

Figure 8:
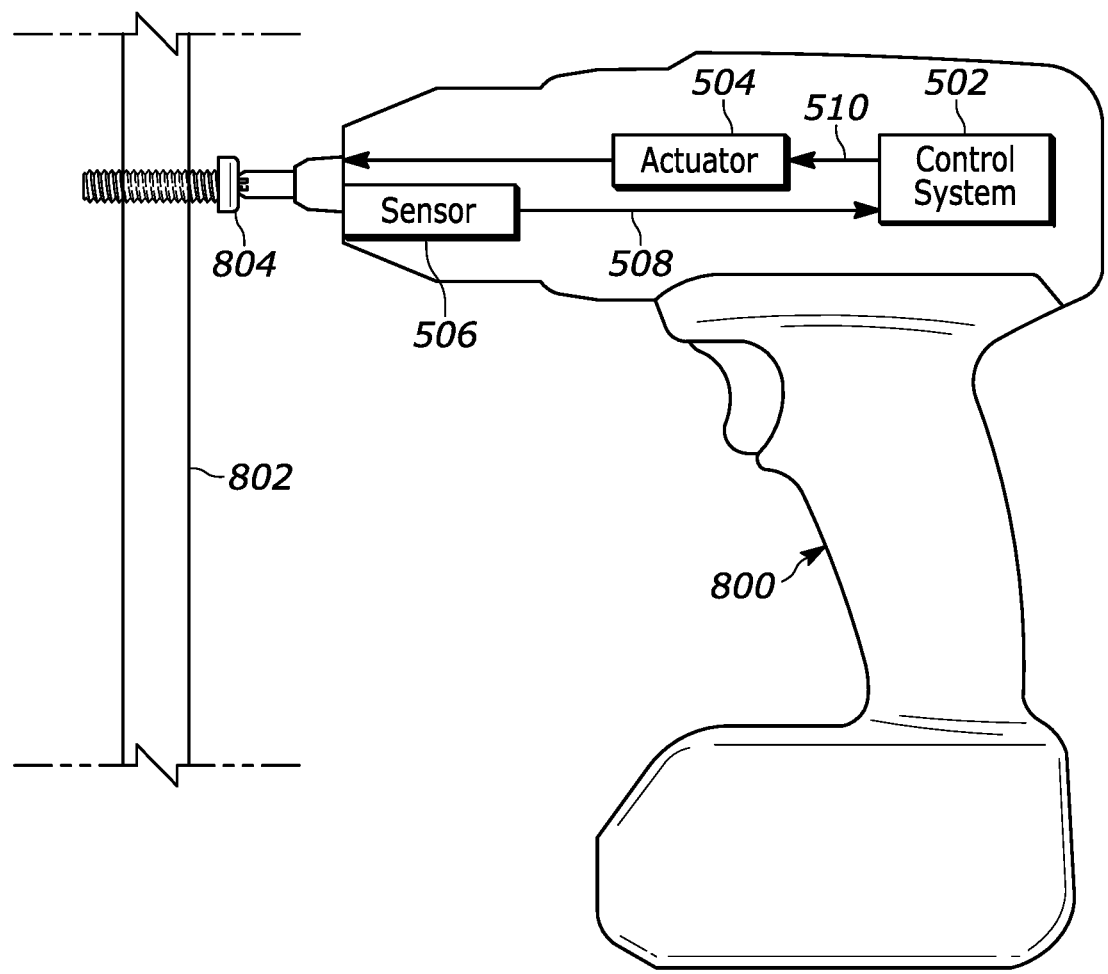
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
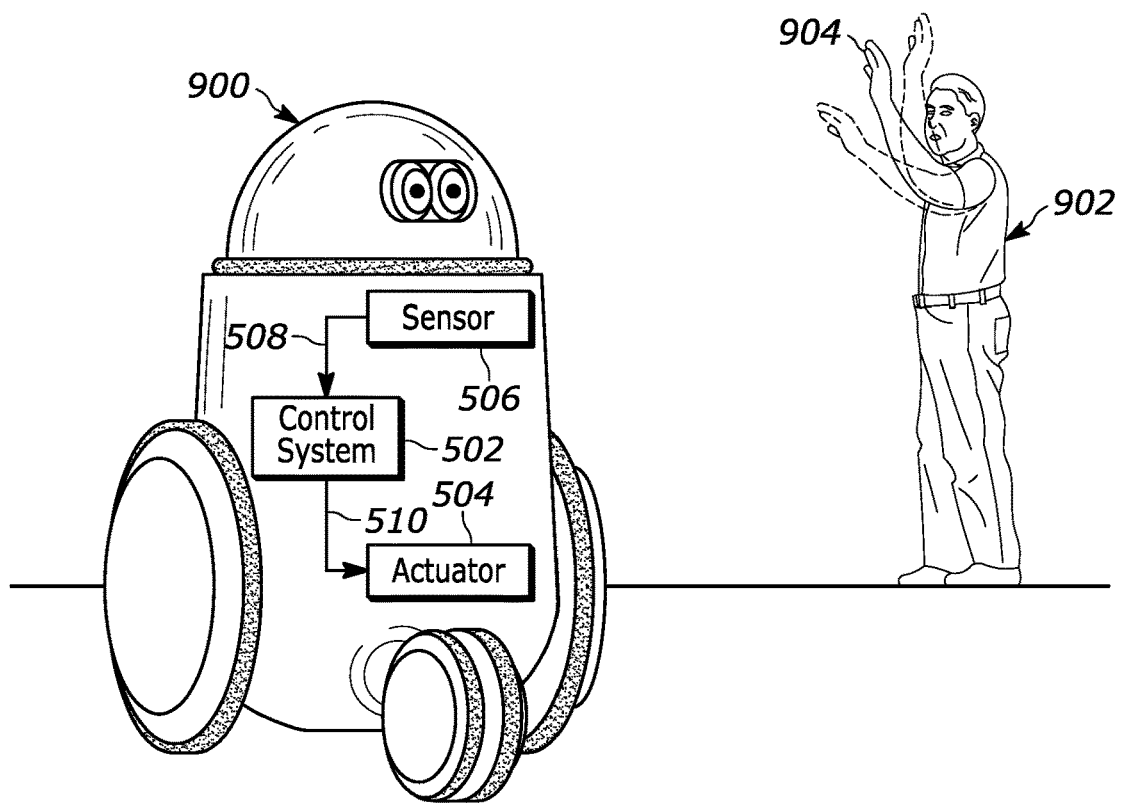
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
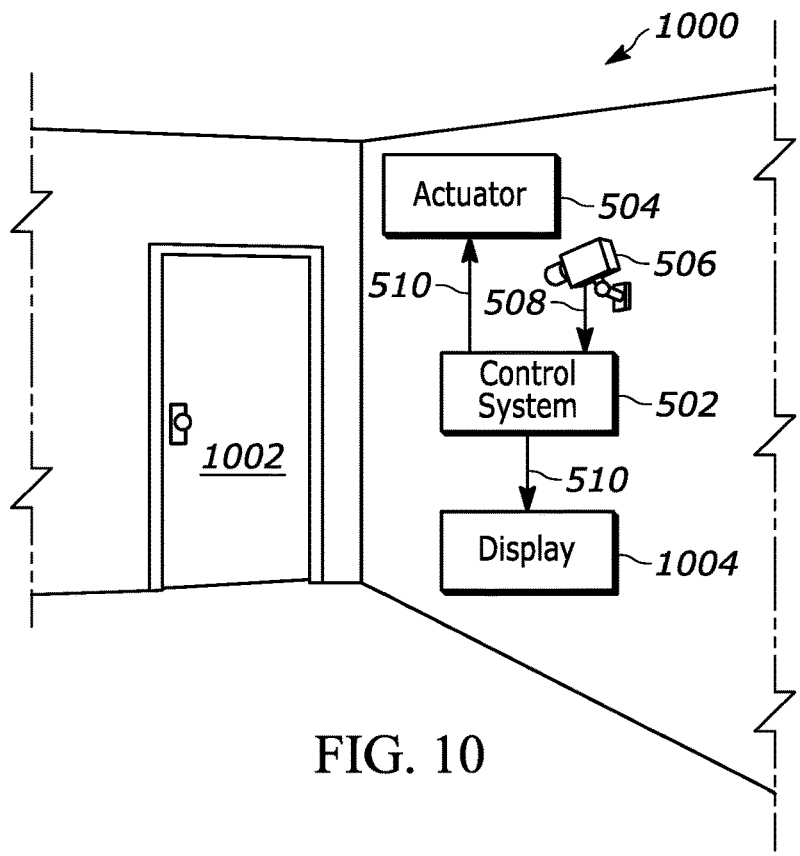
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
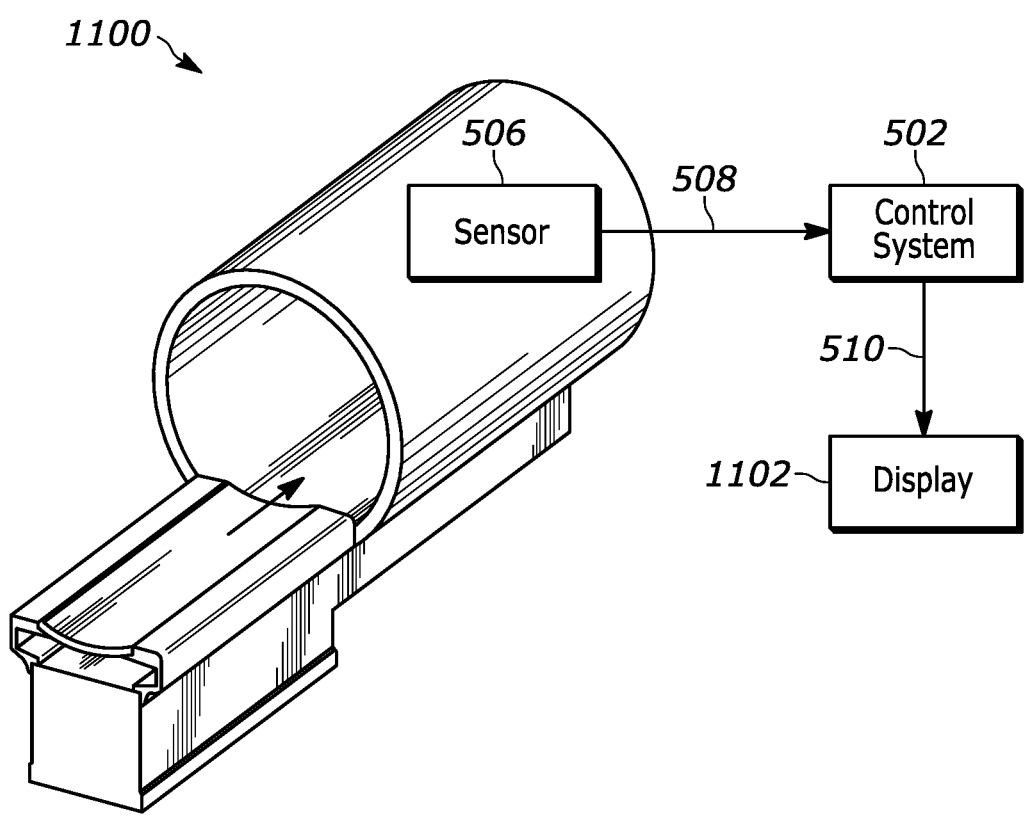
FIG. 11 depicts a schematic diagram of the control system of FIG. 5 configured to control an imaging system, for example an MM apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of identifying an attack comprising:
receiving an input of one or more images, wherein the one or more images includes a patch size and size;
dividing one of the one or more images into a first sub-image and a second sub-image;
dividing a domain of a verification problem into a plurality of sub-domains;
verifying the first sub-image and the second sub-image until all sub-domains are certified or split until each sub-domain contains only one patch location;
classifying the first sub-image and the second sub-image, wherein classifying is accomplished via introducing a Boolean variable in a pixel location associated with the first and second sub-image, wherein the Boolean variable identifies the pixel location; and
in response to classifying the first and second sub-image and identifying an adversarial patch, outputting a notification indicating that the input is not certified.

2. The method of claim 1, wherein classifying is accomplished via utilizing a branch and bound at an input space associated with the first and second sub-image.

3. The method of claim 1, wherein the method includes utilizing mixed integer programming to formulate a patch attack problem utilizing a patch size associated with the one of the one or more images.

4. The method of claim 3, wherein the method includes utilizing a convex program solver to resolve the patch attack problem.

5. The method of claim 1, wherein the image is LIDAR, radar, sonar, thermal, heat, or temperature image.

6. The method of claim 1, wherein the method includes utilizing bagsnet or convmixer as a feature extractor configured to utilize an image size associated with the one of the one or more images to output a feature map.

7. The method of claim 1, extractor has a receptive field smaller than the one of the one or more images.

8. A system for classifying an image, comprising:
a sensor configured to generate one or more images; a controller in communication with the sensor and configured to:
receive an input of one or more images, wherein the one or more images includes a patch size and image size;
divide one of the one or more images into a first sub-image and a second sub-image;
divide a domain of a verification problem into a plurality of sub-domains;
verify the first sub-image and the second sub-image until all sub-domains are certified or split until each sub-domain contains only one patch location;
classify the first sub-image and the second sub-image, wherein classifying is accomplished via introducing a Boolean variable in a pixel location associated with the first and second sub-image, wherein the Boolean variable identifies the pixel location; and
in response to classifying the first and second sub-image and identifying an adversarial patch, output a notification indicating that the input is not certified.

9. The system of claim 8, wherein the image is LIDAR, radar, sonar, thermal, heat, or temperature image.

10. The system of claim 8, wherein classifying is accomplished via utilizing a branch and bound at an input space associated with the first and second sub-image.

11. The system of claim 8, wherein the controller is further configured to verify the first sub-image and second sub-image utilizing $\mathcal{C}_1=\{x_{i,j}, x\in\mathcal{C}, \text{and}(i,j)\in S_1\}$, $\mathcal{C}_2=\{x_{i,j}, x\in\mathcal{C}, \text{and}(i,j)\in S_2\}$.

12. The system of claim 8, wherein the system includes a feature extractor configured to take an image size associated with one of the one or more images and output a feature map.

13. The system of claim 12, wherein the feature extractor includes either bagsnet or convmixer.

14. A method of identifying an attack comprising:
receiving an input of one or more images, wherein the one or more images includes a patch size and size;
divide one of the one or more images into a first sub-image and a second sub-image;
divide a domain of a verification problem into a plurality of sub-domains;
classify the first sub-image and the second sub-image, wherein classifying is done via locating a Boolean variable in a pixel location associated with the first and second sub-image, wherein the Boolean variable includes altering the pixel location;
verify the first sub-image and the second sub-image until all sub-domains are certified or split until each sub-domain contains only one patch location;
in response to classifying the first and second sub-image and not identifying an adversarial patch, continue to divide the one of the one or more images into a plurality of sub-images and classify the sub-images; and
output a notification indicating that the input is not certified in response to identifying an adversarial patch in one of the plurality of sub-images.

15. The method of claim 14, the method further includes outputting a notification indicating the input is certified if all subdomains are certified.

16. The method of claim 14, wherein the method includes utilizing mixed integer programming to formulate a patch attack problem utilizing a patch size associated with the one of the one or more images.

17. The method of claim 14, wherein the method includes utilizing a convex program solver to resolve the patch attack problem.

18. The method of claim 14, wherein classifying is accomplished via utilizing a branch and bound at an input space associated with the first and second sub-image.

19. The method of claim 14, wherein the method further includes verifying the first sub-image and second sub-image utilizing $\mathcal{C}_1=\{x_{i,j}, x\in\mathcal{C}, \text{and}(i,j)\in S_1\}$, $\mathcal{C}_2=\{x_{i,j}, x\in\mathcal{C}, \text{and}(i,j)\in S_2\}$.

20. The method of claim 14, wherein the method further includes utilizing bagsnet or convmixer as a feature extractor configured to utilize an image size associated with the one of the one or more images to output a feature map.

* * * * *